United States Patent [19]

Aldrich et al.

[11] Patent Number: 5,047,883

[45] Date of Patent: Sep. 10, 1991

[54] PANTOGRAPH HEAD MOUNT HAVING DOUBLE LEAVES INTEGRAL WITH A RIGID TIP STRUCTURE

[75] Inventors: William N. Aldrich, Redwood City; Sidney D. Miller, Mountain View, both of Calif.

[73] Assignee: Ampex Corporation, Redwood City, Calif.

[21] Appl. No.: 477,268

[22] Filed: Feb. 7, 1990

[51] Int. Cl.[5] .............................................. G11B 5/56
[52] U.S. Cl. .................................. 360/109; 360/105; 360/107; 360/77
[58] Field of Search ....................... 360/137, 104–109, 360/130.22–130.24, 75, 76, 77

[56] References Cited

U.S. PATENT DOCUMENTS

| | | |
|---|---|---|
| 2,478,223 | 8/1949 | Argabrite . |
| 3,069,667 | 12/1962 | Doody . |
| 3,247,404 | 4/1966 | Batsch . |
| 3,931,641 | 1/1976 | Watrous . |
| 4,099,211 | 7/1978 | Hathaway . |
| 4,106,065 | 8/1978 | Ravizza ............................ 360/107 |
| 4,151,569 | 4/1979 | Hathaway . |
| 4,172,265 | 10/1979 | Sakamoto et al. . |
| 4,184,183 | 1/1980 | Dolby . |
| 4,203,140 | 5/1980 | Watanabe . |
| 4,212,043 | 7/1980 | Baker . |
| 4,236,185 | 10/1980 | Obremski . |
| 4,268,880 | 5/1981 | Majima . |
| 4,337,492 | 6/1982 | Brookhart et al. . |
| 4,363,046 | 12/1982 | Saito . |
| 4,392,163 | 7/1983 | Rijckaert et al. . |
| 4,404,605 | 9/1983 | Sakamoto .......................... 360/107 |
| 4,410,918 | 10/1983 | Watanabe . |
| 4,441,128 | 4/1984 | Ohba et al. . |
| 4,647,999 | 3/1987 | Mlinaric et al. . |
| 4,734,805 | 3/1988 | Yamada et al. . |

FOREIGN PATENT DOCUMENTS

| | | | |
|---|---|---|---|
| 60-74114 | 4/1985 | Japan .................................. | 360/107 |
| 8909988 | 10/1989 | PCT Int'l Appl. ................. | 360/109 |

OTHER PUBLICATIONS

R. R. Rynders, W. L. Grabowski and J. T. Ma IBM Tech. Disc. Bulletin Damped Slider Mount—Aug. 1968 vol. 11 No. 3 pp. 248 and 250.

*Primary Examiner*—Aristotelis M. Psitos
*Assistant Examiner*—Alfonso Garcia
*Attorney, Agent, or Firm*—George B. Almeida

[57] ABSTRACT

A pantographic head mount includes a pair of generally parallel flexible arms each solidly based at an inboard end and solidly affixed at an outboard end to a rigid structure that carries a magnetic head and is driven by an electromagnetic motor positioned to hold the head continuously normal to a recording medium while traversing across the medium. The structure is particularly adapted to resist torsional deformation. The two arms may be structured to have different resonant frequencies, and beating resonance between the arms during high-speed operation is avoided. However, in such case, the structures of the two arms are carefully matched to ensure that they still maintain the head continuously normal to the recording medium. In another embodiment, the arms have differently reticulated structural configurations to present incongruent but equal-area cross-sections at various points along the arm lengths. The two arms may also be formed with differently shaped transverse corrugations or unlike wavy shapes as viewed from the side.

17 Claims, 7 Drawing Sheets

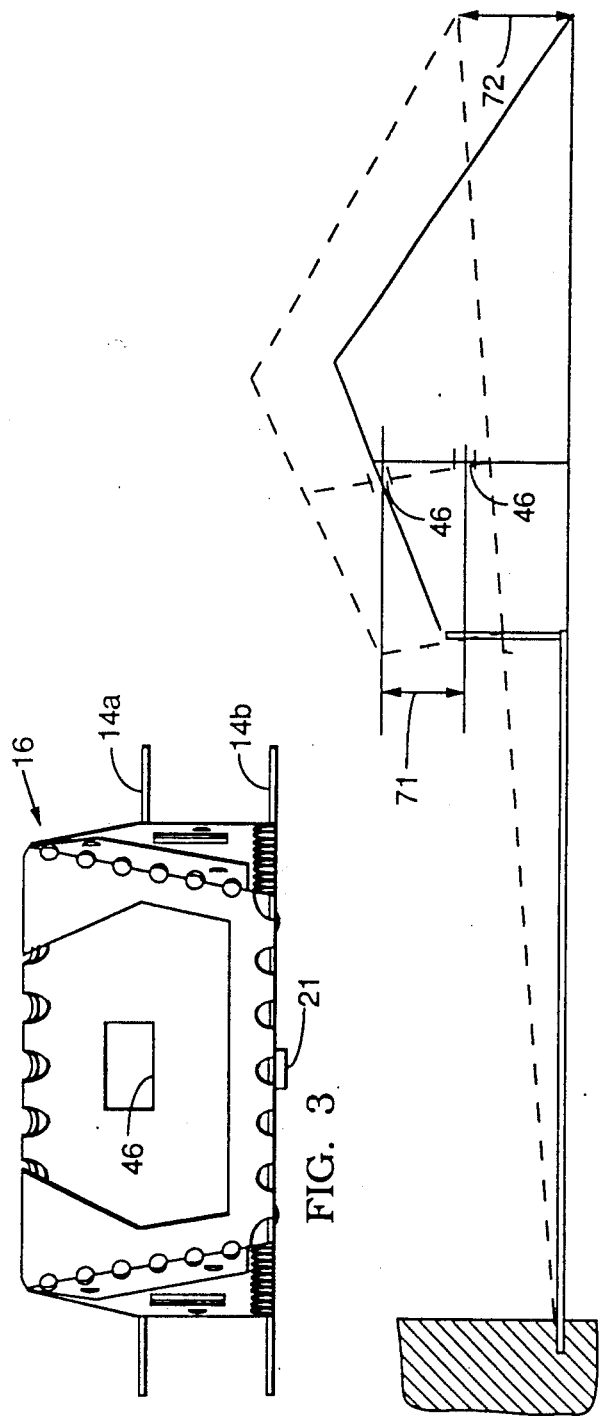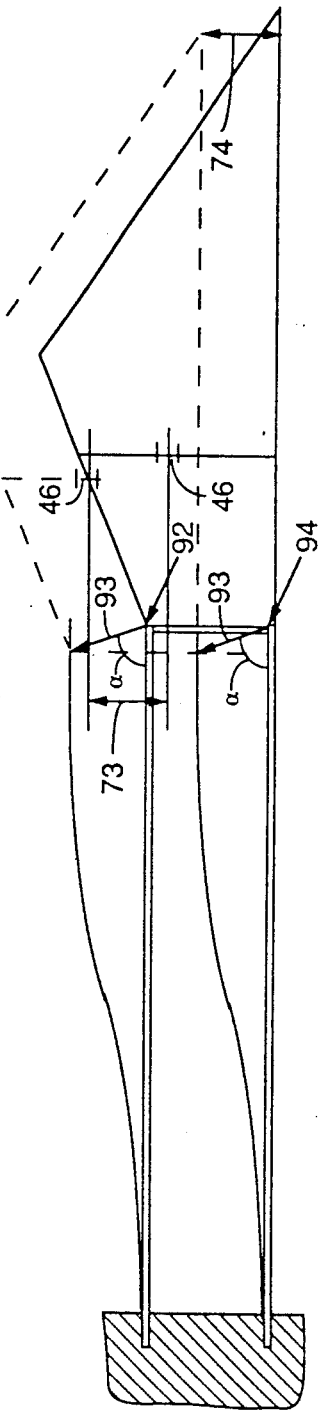

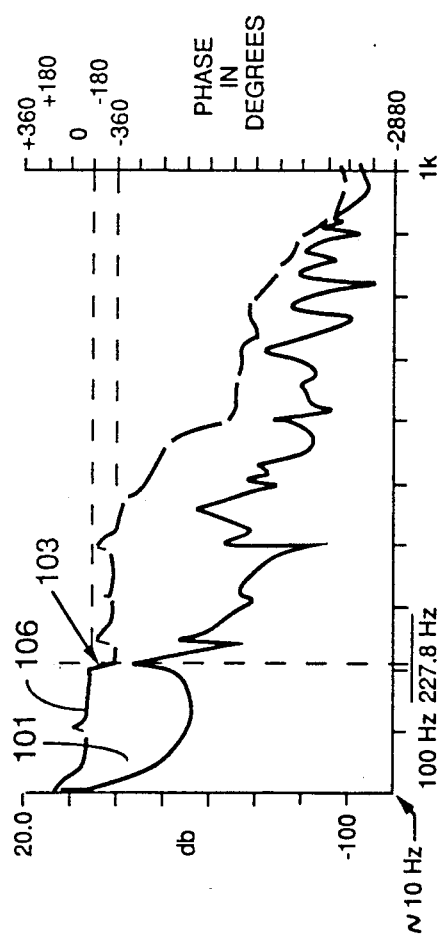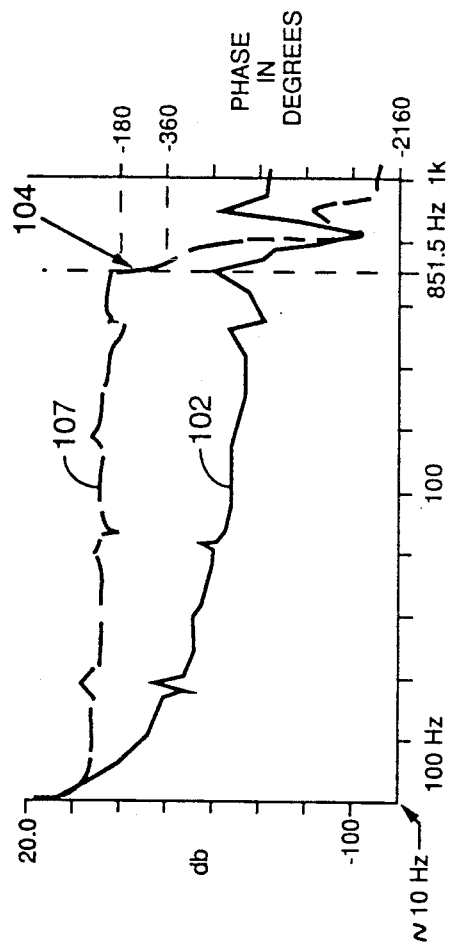

PANTOGRAPH HEAD MOUNT HAVING DOUBLE LEAVES INTEGRAL WITH A RIGID TIP STRUCTURE

TECHNICAL FIELD

This invention relates to magnetic head mounts, and particularly to mounts for moving a magnetic head transversely across a magnetic tape track.

BACKGROUND ART

In the conventional "helical-scan" field of writing and reading television signals on magnetic tape, the tape is moved longitudinally in a helical path around a rotating drum that carries a pair of magnetic heads, which scan tracks that cross the tape diagonally at an acute angle to the tape length, the angle being determined as a compound function (vector resultant) of the longitudinally-directed tape speed and the diagonally-directed head speed. If, during the read mode, the tape is slowed down to provide a "slow-motion" effect, or speeded up to provide a "fast-motion" effect, or stopped to provide a "stop-motion" or "still frame" effect, the head still scans the tape diagonally-transversely, but at a slightly offset angle to the tape tracks. To cause the head to follow a previously-recorded track under such circumstances, it has been usual to mount the head on the end of an arm that deflects under magnetic or electric influence, or that bends transversely to the plane of the drum, and to derive a signal from the continuously reading head to indicate its lateral position with respect to the track being read. That is, a signal indicating that the head is either dead-on the track, or off-center. This signal then is used to control the deflection of the arm to keep the head centered on the track. Aside from controlling head tracking during fast, slow or stop-motion reading modes, this system is also useful in correcting for inadvertent wandering of the head from the track as a result of differences in recording-reproducing machines or operational variations in the tape speed, or as the result of shrinking or extension of the tape length due to temperature or humidity changes between the times and places of recording and reproducing.

Such a structure is taught in U.S. patent application Ser. No. 179,161 filed Apr. 8, 1988, by the present assignee. This structure was particularly devised to overcome limitations of the typical bimorph leaf arrangement, namely a restricted range of lateral motion and a limited speed of response to deflection corrections, which makes the bimorph less suitable for use in apparatus requiring very-high-speed head deflections. For such high-speed deflections, it was desired to use a metal leaf operated by electro-magnetic driving means. But some experimental leaves proved to have undesired resonance vibrations. To solve this problem, the invention of Ser. No. 179,161 now abandoned made the leaf member extremely stiff throughout the greater part of its length, and flexible only in a limited zone adjacent to its bending-pivoting anchorage at the base member to which it was attached. This arrangement provided a substantial increase in the range or width of the band of operating frequencies, and improved the "jump speed" of the automatic-scan-tracking apparatus. That is, it improved the ability of the head to leave the end of a track at one edge of the tape and to jump back to the correct lateral position for approaching the other tape edge, and also for picking up the beginning of the same track or the next, depending on whether the tape is stopped or is moving in normal, slow or fast motion mode. It will be understood that in, for example, a 180-degree helical-scan apparatus, the track itself is wrapped in a helical path around slightly more than 180 degrees of the drum circumference, and two heads are used, each of which which scans the tape for 180 degrees of its circuit and then moves free of the tape for the next 180 degrees while the other head is scanning. During the time of free movement, the head on its arm must make the so-called lateral "jump" to correct for any mis-alignment caused by the stopping, slowing or speeding-up of the tape, or by its having shrunk or stretched.

However, it has been the object of continuing research to obtain the advantages of a pantographically connected pair of parallel leaves, as an alternative to the single leaf of Ser. No. 179,161.

The primary benefit of an ideal pantographic structure is to maintain the head perpendicular to the tape at all deflections.

Another advantage of the pantographic structure is that a head deflection sensing means can be mounted on the head-carrying portion of the pantograph, and at a convenient shorter radius, while maintaining the ratio of head-deflection to sensing-means deflection at a value of unity, so as to achieve an optimum signal-to-noise ratio. Examples of structures subject to or solving this problem include U.S. Pat. Nos. 4,337,492, 4,099,211 and 4,212,043.

One problem, however, that sometimes is encountered with existing pantographs, is that the parallel arms are made to be stiff and rigid (see U.S. Pat. No. 4,212,043), and bending stresses are concentrated at four points—two for each of two pantograph arms.

In some uses, such concentration of stresses may be tolerable. However, in the use intended for the present invention, such concentration of repeated bending stresses would engender the danger of early failure, for the arms must be made extremely thin in order to increase the resonant frequencies of the arms to values above the zone in which they might cause instability in the operation of the position servo mechanism. With such thin arms, the repeated flexings at concentrated points would contribute to much shorter fatigue life.

With a pair of un-stiffened, flexible arms, however, each arm can be flexed in an S-shaped curve, and the system may be operated at high speed, yet the bending stresses are distributed along the length of the arm, and the arm life is maintained at a much higher value.

With two elongated flexible arms, however, the ensemble, in the exacting uses contemplated for the present invention, may be extremely sensitive to torsional deflection and vibration of the arms about their longitudinal axes, which can throw off the tracking of the head both directly and also indirectly, as by affecting the operation of the head-position sensing means that is needed to control and correct the tracking (see for example, the arrangement of U.S. Pat. No. 4,363,046).

Not only dynamic torsional deflection has been a problem in the prior art, but also permanent torsional deformation, such as often occurs when the apparatus is being cleaned by hand. If the structure cannot resist such deformation, it may become "sprung" beyond its elastic limit, like the hinge of a door, and can be bent back into its originally manufactured conformation only with great difficulty. It often may better be replaced entirely, for clearly, to operate the system in "sprung"

condition would be to set the head at an incorrect azimuth with respect to the tape track, to produce relative displacements between the head gaps in a multiple-gap head stack, and more importantly, to interfere with smooth track-to-track operation of the apparatus.

A final problem with some prior art pantographic designs is that, when subjected to the high-speed flexures at which the present invention is meant to operate, the two arms might have nearly the same harmonic resonating frequencies, and when such a frequency is reached, the action of each arm might tend to exacerbate the action of the other, and a "beating" effect may occur that is much more severe than it would be for either arm alone.

Accordingly, the present invention advantageously improves the accuracy of orientation of the head with respect to the tape, improves the frequency response and jump speed of a mount which moves a magnetic transducing head transversely across a magnetic tape track, achieves a servo gain ratio of unity, improves the resistance of such a mount to torsional deformation, and avoids the tendency for beating resonance between the two arms of a pantographic mount.

BRIEF SUMMARY OF THE INVENTION

These advantages are accomplished in a pantographic head mount comprising a pair of generally parallel flexible arms each solidly based at an inboard end and affixed at an outboard end to a voice-coil-driven rigid structure that carries a magnetic head or multiple head stack and holds it continuously normal to a recording medium while traversing across the medium. The ensemble has a structure that resists torsional deformation. In a further embodiment, the two arms are structured to have different resonant frequencies, and beating resonance between the arms during high-speed operation is avoided. However, the structures of the two arms are carefully designed to ensure that they still maintain the head continuously normal to the recording medium. In one embodiment, the arms have different reticulated structural configurations so as to present incongruent but equal-area cross-sections at various chosen points along the arm lengths. The two arms may also be formed with differently shaped transverse corrugations or unlike wavy shapes as viewed from the side.

BRIEF DESCRIPTION OF DRAWINGS

FIG. 3 is a right side elevational view of the apparatus of FIG. 1, taken substantially on the line 3—3 of FIG. 1;

FIG. 4 is a schematic elevational view of an apparatus of the prior art;

FIG. 5 is a schematic elevational view of the arrangement of the present invention for comparison with that of FIG. 4;

FIG. 9 is a schematic graph illustrating characteristics of a prior art stiff-arm pantographic apparatus; and FIG. 10 is a schematic graph illustrating characteristics of the apparatus of FIG. 1 for comparison with that of FIG. 9.

BEST MODES FOR CARRYING OUT THE INVENTION

Figure 1:
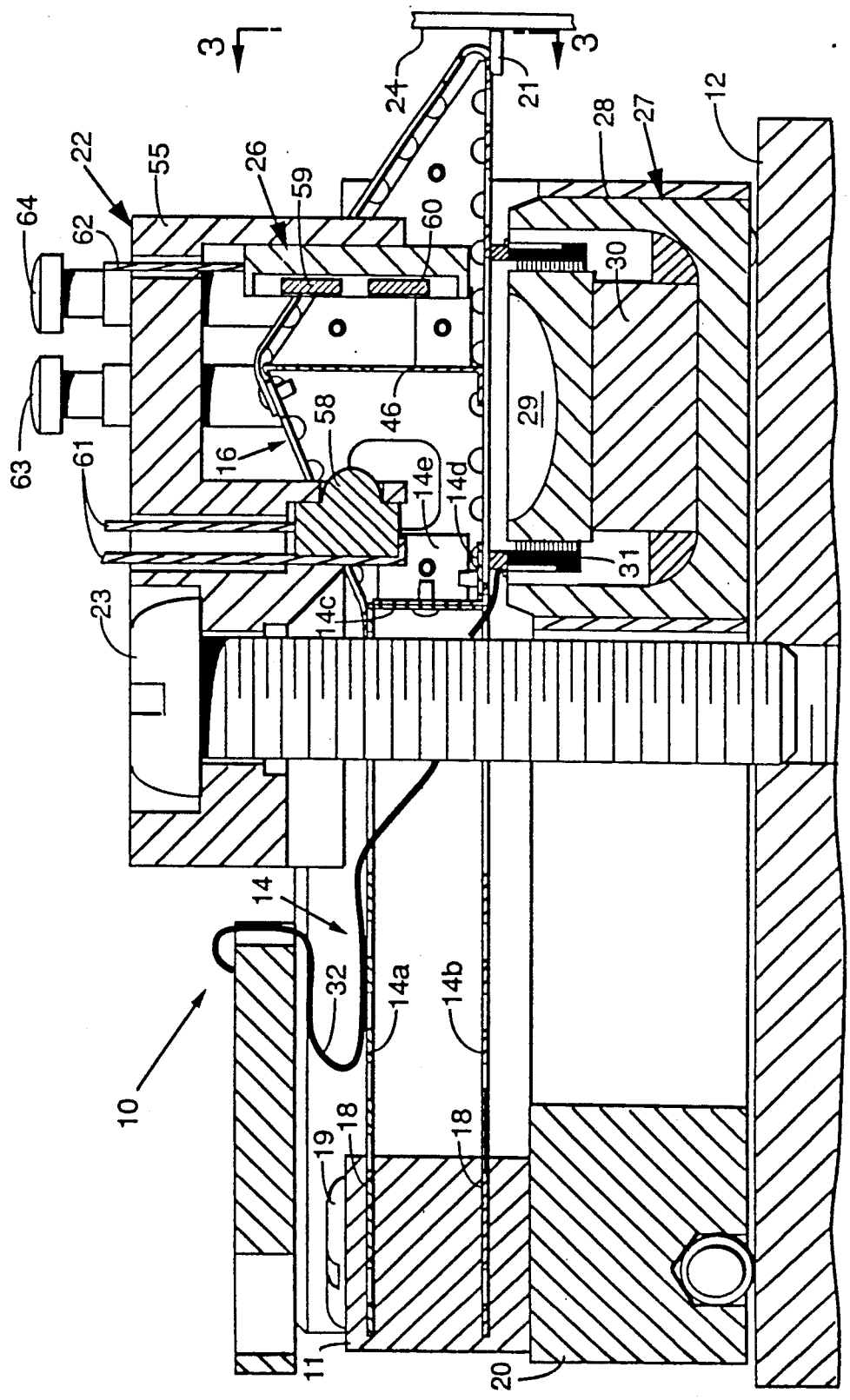
FIG. 1 is a longitudinal cross-sectional elevation view of the head mount of the invention, taken substantially on the plane of line 1—1 of FIG. 2.
Figure 2:
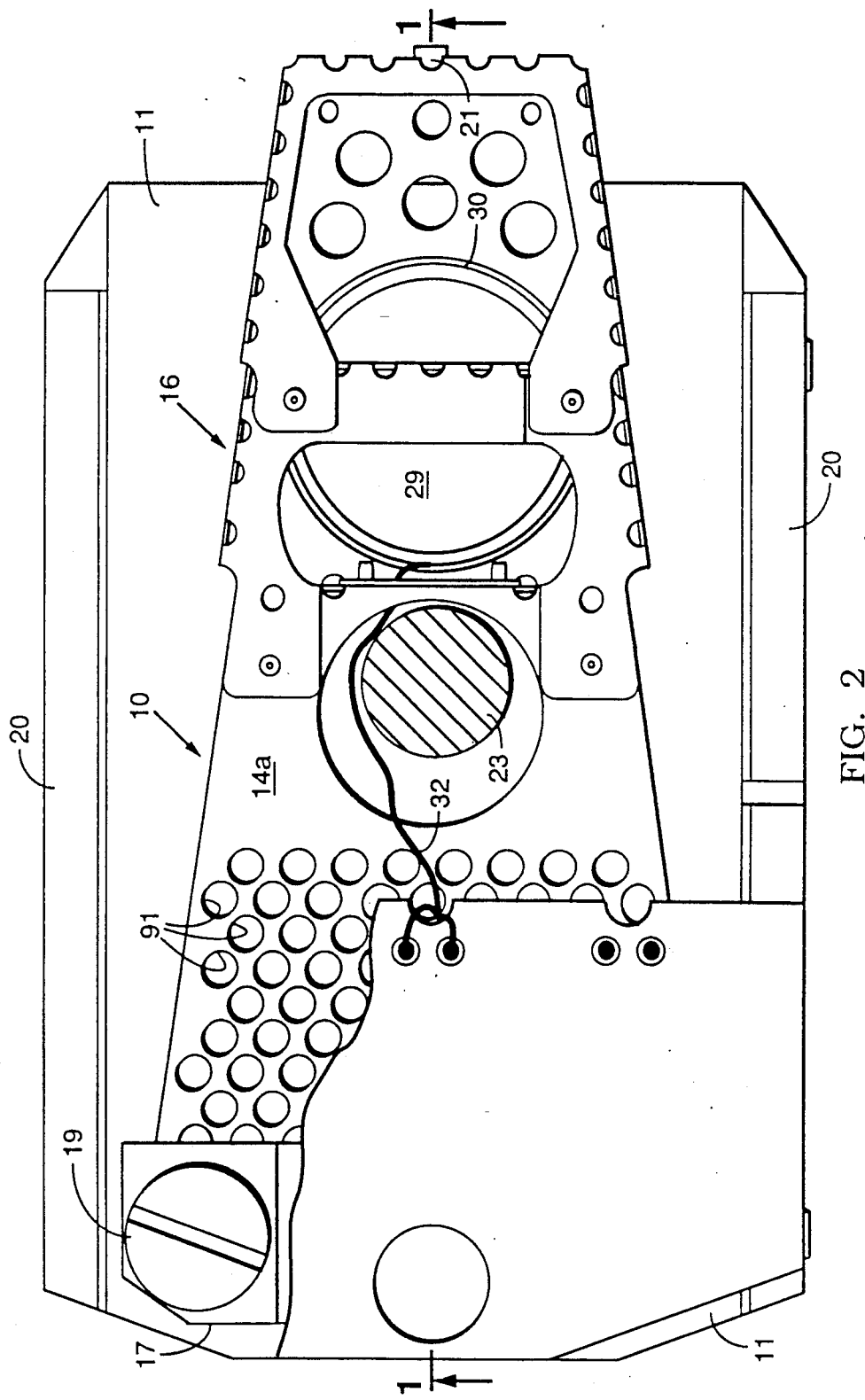
FIG. 2 is a plan view of a portion of the apparatus of FIG. 1.

Turning now to the drawings, and particularly to FIGS. 1-3, there is shown a head mounting assembly 10, comprising a base 11 attached to a rotating head drum 12, which rotates about an axis that lies in the plane of the paper (FIG. 1) to the left of the assembly 10 and extends parallel to the height of the assembly 10. The particular structure of the present invention comprises a generally parallel-arm pantographic assembly 14, including an upper flexible arm 14a and a lower flexible arm 14b, the two arms being joined by an intervening web portion 14c integral with arm 14a. Arm 14b has an integral extension to the right forming the bottom plate and nose portion of a rigid head-carrying structure 16 (see below). Both arms 14a and 14b are formed with numerous perforations 91 to decrease the mass of the arm. From the web portion 14c, and integral therewith, extends a tab portion 14d, which is bent orthogonally to the web, parallel to the arm 14b and toward the right, so as to make it possible to join the two arms together solidly as by means of fasteners, adhesives or welds. Also extending to the right from the web 14c are two tab portions 14e, orthogonal to the planes of the arms 14a, 14b and nearly orthogonal to the plane of web 14c. The tab portions 14e are meant for joining (riveting or welding) the element 14 to the side walls of the rigid head-carrying structure 16 to define therewith a truncated-wedge shaped deflecting assembly 14, 16 (see also FIG. 2). The assembly 14, 16 deflects upwardly and downwardly, as seen in FIG. 1, from a clamping structure 17 mounting the leftmost end portions 18 of the arms 14a, 14b (FIG. 1), which are clamped solidly by means of clamping bolt 19, which is threaded into the base 11.

As may be seen, the above-described rigid structure 16 is proportioned and formed with a stubby, box-like construction characterized by width, height and length dimensions all in the same general order, so as to maintain optimal torsional stability of the entire mount and particularly of the spring arm leaves that are integrated with the rigid portion 16. In other words, the rigid portion 16 is strongly cross-braced along all of its three orthogonal planes—length, width and height—and is particularly adapted to help the two flexible spring-arm leaves resist torsional deformation, for the width of the structure at the portion 14c (see FIGS. 2 and 3) is greater than the height at that portion (see FIGS. 1 and 3), and the length of the portion 16 (FIGS. 1 and 2) is hardly more than twice the maximum height dimension.

Thus the favorable bending characteristics of the pantographic structure including the flexible arms 14a and 14b receive the benefit of enhanced torsional stability from the rigid structure 16. The structure 16 maintains the width and spacing of leaves in a rigid relation that substantially eliminates torsional deflections of the leaves 14a and 14b.

The reason for extending arm 14b to the right to help define the rigid structure 16 is primarily to increase the structural integrity of the apparatus, but in some embodiments of the invention this extension of arm 14b carries further benefits, described more fully below.

A magnetic transducing head 21 is mounted on the rightmost tip of the rigid portion 16 of the arm structure, and is particularly affixed to the underside of the rightwardly-extending portion of the lower arm 14b, just at the tip point where this extending portion is bent upwardly and to the left to define an acute angle opening toward the left.

As shown in FIGS. 1 and 2, the base 11 has a pair of upstanding side walls 20, across the tops of which is arranged a bridging clamp member 22 (FIG. 1 only), which is bolted to the head drum 12, together with the base 11, by means of a bolt 23. The clamp member 22 supports a head position sensing apparatus 26, which is described in further detail below.

Beneath the rigid portion 16 of the head mount is disposed a voice-coil mechanism 27, which includes a cup-shaped outer pole piece 28 and an inner pole piece 29 assembled with a permanent magnet 30 therebetween, structure the two pole pieces is suspended a hollow cylindrical coil member 31, which extends from the underside of the rigid head mount portion 16. Leads 32 extending from the coil 31 carry the operating current used to move the coil 31 and head 21 up or down, depending on the current polarity, for positioning the head transversely of the magnetic track (not shown) on a magnetic tape 24.

To avoid disturbing the magnetic circuits of the voice-coil, and those of the head 21 and tape 24, all other portions of the structure so far described are made of non-magnetic material, such as aluminum or stainless steel (or copper for the coil 31 and leads 32).

To provide a mask element for sensing the lead's transverse position by the head position sensing means 26, the rigid structure 16 of the head mount has an inner vertical wall containing an aperture 46. A light source and photocell apparatus also is provided that cooperates with the mask and aperture 46. To this end the clamp member 22 is formed with a body portion 55 and with a portion depending therefrom for mounting a light-emitting diode ("LED") 58, which shines through the aperture 46 from the inboard side thereof. On the outboard side of the aperture 46, and on a suitable depending portion of body 55, are mounted a pair of photocells 59, 60, which receive respective portions of the light from LED 58 that are passed by the aperture 46 as the head 21 and associated mask and aperture 46 reciprocate. The LED 58 is supplied with voltage through leads 61 and insulated posts 63, and the currents generated by the photocells 59, 60 are drawn off by leads 62 coupled to insulated posts 64, as by means of a flex-circuit interconnection (not shown).

Servo circuits that may be used to receive the signals from photocells 59, 60, to control the position of head 21 through the coil 31 of the voice-coil motor, are exemplified in U.S. patent application Ser. No. 179,161, and per se form no part of the present invention. It should be clear, however, that such circuits are constrained to operate more precisely by reason of the innovations in the physical structure of the head mount of the present invention. The head mount of Ser. No. 179,161 comprised a single leaf structure in which the leaf bends essentially about the point in block 11 where the lower arm 14b of the present invention enters block 11. Consequently, for all deflected positions of the leaf, the vertical displacement of a respective aperture 46 is smaller than the vertical displacement of an associated head 21 (compare dimensions 71, 72 in FIG. 4), resulting in an other-than-optimum signal-to-noise ratio for the servo system. In the present invention, because the rigid structure 16 of the mount moves up and down at the end of the pantograph 14 without pivoting, tilting or changing orientation, the displacement of the aperture 46 is always substantially the same as the displacement of the head 21. That is, the displacement ratio between aperture 46 and head 21 is always unity, and the S/N ratio is optimum (compare dimensions 73, 74 in FIG. 5).

Another important feature of the present invention is a further application of the principle of altering the structure of the head mount to improve the electronic performance of the head servo system. This feature relates to undesired aberrations that appear in the signal from the sensing photocells 59, 60 as a result of resonant harmonic vibrations in the deflecting arm or arms of the mount. The higher the frequency of operation, the more numerous are the combinations of structural relationships that produce resonance. One known method for evading such combinations is to de-regularize the conformation of the structure, and one sub-method of this method is to avoid symmetries during design of the structure. However, one basic symmetry that cannot be done without in a pantographic apparatus is the equispacing of the two arms of the mount, at least at the two ends of the arms. If the two pairs of ends are not equispaced, then the rigid structure 16 of the mount will alter its inclination to the tape as it traverses the magnetic track, and the ratio of displacements of the head 21 and aperture 46 will depart from unity.

The mid-portions of the arms 14a and 14b preferably also are provided with asymmetrical structural variations. Accordingly, the present invention contemplates forming the two arms with transverse corrugations 81 and 82 of unlike shape, as shown in FIG. 6.

Figure 6:
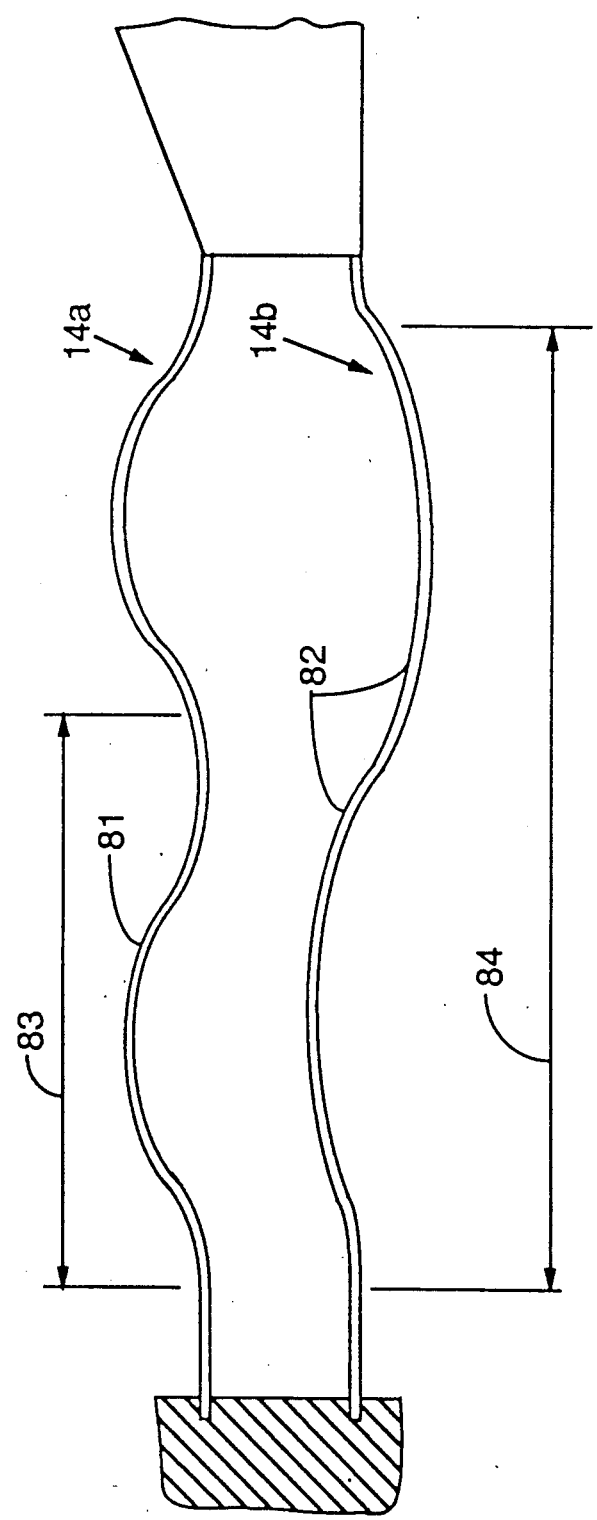
FIG. 6 is a schematic elevational view showing a variation of the apparatus of FIG. 5.

Particularly demonstrated in FIG. 6 are a set of corrugations formed as sine waves, but with the corrugations 81 having a pitch 83 that is different from the pitch 84 of corrugations 82. However, many other variations would also be suitable, so long as corrugations 81 are different from corrugations 82, either in shape or dimension.

Figure 7:
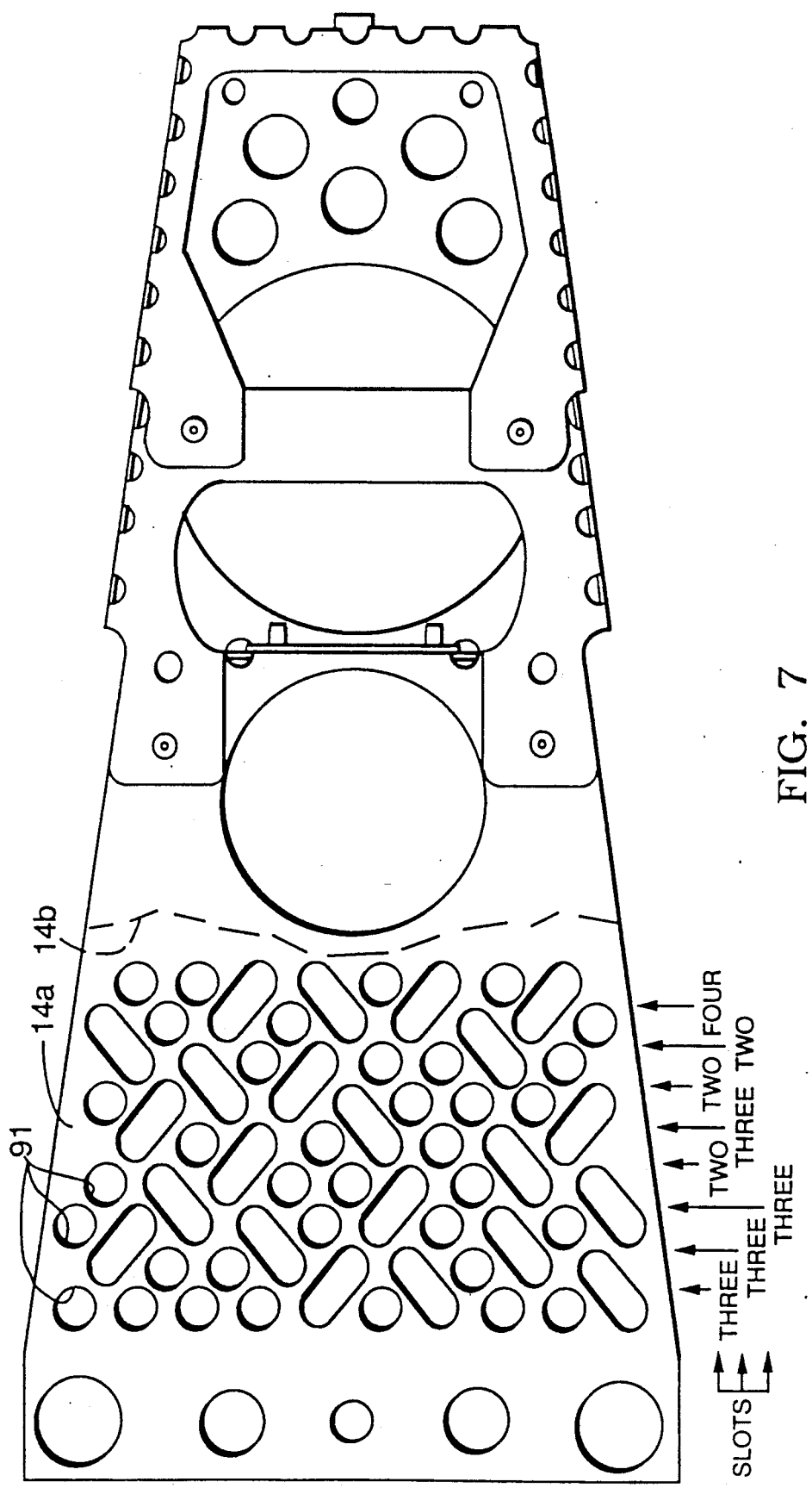
FIG. 7 is a partly broken-away plan view illustrating a pattern of perforations for the upper arm of FIG. 1.
Figure 8:
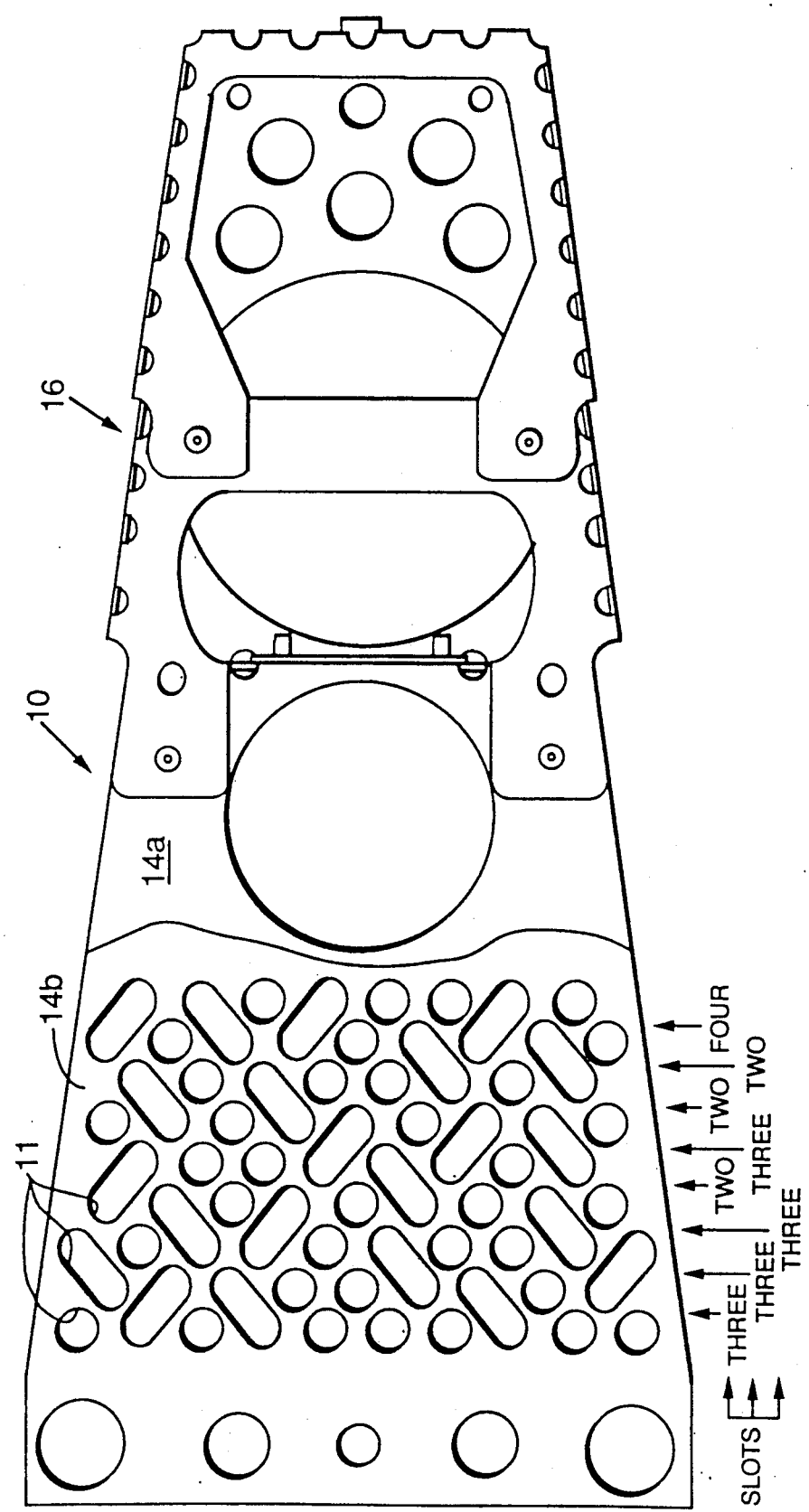
FIG. 8 is a partly broken-away plan view illustrating a pattern of perforations for the lower arm of FIG. 1.

To the same end, to avoid symmetries, the two arms 14a and 14b may be formed as shown in FIGS. 7 and 8, to have differently reticulated structural configurations, and to thereby present incongruent but equal-area cross-sections at various chosen points along the arm lengths. Particularly, the arms have incongruent patterns of perforations 91 that are substantially random and asymmetrical about any line or point, and with the pattern for one arm being different from that of the other arm. Nevertheless, both arms still having substantially equal cross-sectional areas transverse to the arm length at various given points along the arm length. In FIG. 7, the pattern of circular perforations 91 that is shown in FIG. 2 is varied in the upper arm 14a so that four of the circular perforations in the most outboard row are joined to four of the perforations in the next-inboard row to define four oblong slots. In FIG. 7, the showing of the lower arm 14b is broken away in the Figure so as to show the pattern of 14a more distinctly, because the pattern of 14b is different from that of 14a, as shown in FIG. 8. In arm 14b a different four pairs of circular holes 91 in the outboard and next-to-outboard rows are joined to make slots. Similarly, the second and third rows are joined by two slots in each arm; the third and fourth rows by two slots; the fourth and fifth rows by three slots; the fifth and sixth rows by two slots; the sixth and seventh by three slots; the seventh and eighth by three; and the eighth and ninth by three. Although the patterns are different for each pair of rows, the cross-sectional areas of the arms, at any radius of motion of the arms in the general zone of perforations 91, remain equal. It follows that the qualities of stiffness or flexibility are equal for both arms at any such radius, and the S-shaped or "first-order" bending curves must also remain identical.

Having the same bending curves, or the equivalent as discussed further below, is important because an effect that is essential to the parallel motion of the head 21 is thereby produced. Namely, the outboard portion 92 (FIG. 5) of the upper arm 14a always moves exactly the same distance 93, and in exactly the same direction "alpha", as does the outboard portion 94 of the lower arm 14b. In other words, the points 92, 94 always move in parallel motion with respect to one another, and the head never tilts or changes its inclination to the recording medium.

But this essential condition, that portions 92, 94 always move in parallel motion, can also be achieved even if the two arms 14a, 14b do not have the same bending curves, so long as the respective bending curves are carefully designed, i.e., "matched", to produce equivalent parallel motion of the points 92, 94.

For example, the upper arm 14a could bend more sharply (smaller radius of curvature) near its fixed end, and more gently (greater radius of curvature) near its outboard portion 92, while the other arm 14b bends more sharply near the outboard portion 94 and more gently near the inboard end, so long as both arms translate their outboard portions 92, 94 in the same direction and to the same distance. The more sharply bending portions might have smaller cross-sectional areas, and the more gently bending portions might have greater cross-sectional areas. But the end result would be unchangeable, the head would be translated but not tilted or pivoted.

In other words, the first and second locations at which the arms 14a and 14b are attached respectively to the base 17, and the third and fourth locations 92 and 94, respectively, have a parallelogram relationship in that these four locations define the vertices of a parallelogram relationship in that these four locations define the vertices of a parallelogram. When the head-carrying structure 22 is loaded and thereby displaced by the motor means 27-31, a parallelogram relationship of this type is maintained, with the result that the head 21 always remains perpendicular to the magnetic tape.

It is even possible to manufacture the arms of different materials, so long as the combination of structure and flexibility of the one arm is matched with the combination of structure and flexibility of the other arm, so as to produce the equivalency and the parallelogram relationship defined above, to prevent the head from tilting.

Of course, equivalency of this type is required for satisfactory operation of the dissimilar wavy-shaped structures of FIG. 6.

It should be understood that one underlying purpose of having perforations 91 is to enable a greater width dimension for the arm without increasing the mass thereof, thus to give the arm a greater resistance to torsional deformations of the type that can be produced by banging or knocking the arm about during head cleaning or adjustment. However, when the perforation pattern is made to be asymmetrical, then two further advantages are gained at one stroke: the desired asymmetry is attained by use of the perforations, and also the increased torsional stiffness.

A comparison of the actual performance of a 10:1 scale model of the present invention with that of a similarly scaled model of a prior-art type of pantographic structure with stiffened arms, is presented in FIGS. 9 and 10. Both charts begin at about the first resonant frequency, near 10 Hz, at the leftmost point of the abcissa, and extend to the right to about 1000 Hz. These models were constructed at a scale of 10:1, and it follows that for the actual prototype, having a scale of 1:1, the frequencies shown on the charts should be translated accordingly, as by multiplying them by a factor of ten. The solid line curve in each chart, 101 for FIG. 9 (prior art), and 102 for FIG. 10 (present invention), represents the relative amplitude of deflection of the deflecting structure for a given (constant) experimental input, and at the frequencies covered by the chart. This relative amplitude is measured in terms of decibels ("dB") as indicated along the ordinate axis at the left side of the chart, the range covered being between +20.0 and -100 dB. The useful range of frequencies for each structure extends to the right as far as the second resonant frequency of the structure, indicated by reference numeral 103 at 227.8 Hz for FIG. 9 and by reference numeral 104 at 851.5 Hz for FIG. 10. At this frequency in each structure, the displacement of the leaf arms undergoes an almost instantaneous 180-degree phase shift. In other words, for the prior art model of FIG. 9, between the first and second resonant frequencies of 10 Hz and 227.8 Hz, the input signal has a sinusoidal shape with a pitch or time lapse between peaks that is inversely proportional to the frequency, and the motion of the leaf arms is constantly in phase with this sinusoidal variation. When the signal is increasing on its sinusoidal curve, the deflecting motion of the leaf arms is in a first direction, and when the signal is decreasing on its sinusoidal curve, the arms are deflecting in the opposite direction. This relationship is indicated by the dashed-line curves 106 for FIG. 9 and 107 for FIG. 10 which remains substantially flat between the first and second resonant frequencies in each case. For curve 106 the phase of the head motion with respect to the input signal is about -108 degrees as indicated on the phase-in-degrees scale along the right-hand ordinate axis. However, at the second resonant frequency 103 (227.8 Hz), the phase value suddenly drops by about 180 degrees, meaning that the arms are now moving in the second direction instead of the first when the input signal is increasing. Similarly, in FIG. 10, the phase curve 107 remains substantially flat at about zero-degrees from 10 Hz all the way to the second resonant frequency 104 at 851.5 Hz, where the curve takes a sharp plunge to a negative multiple of 180 degrees.

Clearly, by this showing, the present invention multiplies both the useful bandwidth and the upper frequency limit of the electronic system by a factor of nearly four, simply by changing the structure in such a way as to raise its second resonant frequency.

What is claimed is:

1. A pantographic mount for moving a magnetic transducing head transversely across a magnetic tape, comprising:
   a support base;
   a rigid tip structure carrying said magnetic head in a normal relationship to said tape;
   a pair of elongated spring arm leaves of different natural frequencies of vibration, each having an inboard end portion thereof solidly mounted on said support base and an outboard end portion thereof solidly integral with said rigid tip structure, said leaves being arranged in parallel with length and width dimensions of each spring arm leaf being parallel, respectively, to the length and width dimensions of the other spring arm leaf, so as to define said mount as a flexible pantograph maintaining said head in said normal relationship to said tape when said rigid tip structure is displaced in directions orthogonal to said length and width dimensions of said spring arm leaves;

wherein each of said spring arm leaves is formed of a material having predetermined flexibility characteristics, and each of said leaves has a structural configuration that is different from the structural configuration of the other leaf with the structural configuration of each leaf selected to cooperate with said flexibility characteristics of the leaf to cause the portion thereof adjacent said rigid tip structure to deflect in the same displacement direction and to the same displacement dimension as the portion of the other leaf adjacent said rigid tip structure, whereby the natural frequency of vibration of each leaf is different from that of the other leaf;

wherein each of said spring leaves has a reticulated structural configuration of solid portions defining a plurality of openings through the thickness of the leaf so as to reduce the inertia of the leaf during flexing movement, while maintaining a predetermined resistance of the leaf to torsional distortion about a length axis thereof, wherein said openings are arranged in a first reticulated structural configuration for one of said leaves, and in a second reticulated structural configuration for the other leaf, said first and second configurations being substantially incongruent, so as to avoid beating resonances between the two leaves during operation;

said rigid tip structure being proportioned and formed with a box-like construction characterized by selected width, height and length dimensions for providing optimum torsional stability of said mount and particularly of said spring arm leaves integral with said rigid tip structure thereof; and electromagnetic means mounted for acting upon said rigid tip structure to deflect said head and the outboard portions of said spring arm leaves in said directions orthogonal to said length and width dimensions of said leaves, so as to move said magnetic head transversely while maintaining said normal attitude of said head with respect to said tape.

2. A magnetic head mount as recited in claim 1, wherein said solid portions defining said openings are arranged in patterns that are asymmetric with respect to any line and point lying within the area of the respective leaf, so as to avoid harmonic vibrational distortions of the motion of the head.

3. A magnetic head mount as recited in claim 2, wherein said solid portions defining said openings are arranged to have substantially equal cross-sectional areas transverse to the respective leaf lengths at any given point along said respective lengths, further to avoid harmonic vibrational distortions of the head motion.

4. A magnetic head mount as recited in claim 1, wherein said solid portions defining said openings are arranged in patterns that are asymmetric with respect to the central plane that is orthogonal to the width dimensions of the leaves; and said solid portions defining said openings are also arranged to provide cross-sectional areas for the leaves, in planes normal to the lengths of the leaves, that are equal in value at any point along said lengths.

5. A magnetic head mount as recited in claim 4, wherein said patterns are also asymmetric with respect to the transverse centerlines of the leaves.

6. A magnetic head mount as recited in claim 1, wherein said spring leaves are formed to present wavy profiles in planes orthogonal to the width dimensions of the leaves;

said wavy profiles being different for the two leaves, so as to avoid harmonic vibrational distortions of the head motion.

7. A magnetic head mount as recited in claim 1, wherein said spring leaves are formed to present sinewave profiles in planes orthogonal to the width dimensions of the arms;

said sine-wave profiles having equal wave-height amplitudes but different wave-length periods for the two leaves, so as to avoid harmonic vibrational distortions of the head motion.

8. A magnetic head mount as recited in claim 1 in which a first of said leaves is longer than the second and extends to a greater length dimension from said base portion; and said first leaf forms one side of said rigid head carrying tip structure;

whereby the two leaves are caused to have different shapes for the purpose of decreasing their tendencies to resonate beatingly together.

9. A pantographic mount for moving a magnetic transducing head transversely across a magnetic tape, comprising:

a base member, a rigid head-carrying member, and a pair of first and second spring leaves each formed of a material having predetermined flexibility characteristics, said leaves being solidly affixed to said base member at respective first and second locations thereon and to said rigid head-carrying member at respective third and fourth locations thereon, said locations having a parallelogram-defining relationship in that said locations define vertices of a parallelogram;

each of said leaves having a structural configuration that is different from the structural configuration of the other leaf, and the structural configuration of each leaf being selected to cooperate with said flexibility characteristics of the leaf to maintain a parallelogram-defining relationship of said locations to one another when said rigid head-carrying member is deflected under load; and wherein each of said spring leaves has a reticulated structural configuration of solid portions defining a plurality of openings through the thickness of the leaf, so as to reduce the inertia of the leaf during flexing movement, while maintaining a predetermined resistance of the leaf to torsional distortion about a length axis thereof, wherein said openings are arranged in a first reticulated structural configuration for one of said leaves, and in a second reticulated structural configuration for the other leaf, said first and second configurations being substantially incongruent, so as to avoid beating resonances between the two leaves during operation;

electromagnetic motor means arranged to load and to thereby deflect said rigid head-carrying member in reciprocating directions on the magnetic tape;

whereby the natural frequency of vibration of each leaf is different from that of the other leaf, and beating resonance of said leaves is avoided during operation while the head moves relative to said magnetic tape in parallel motion without changing its inclination thereto.

10. A magnetic head mount as recited in claim 9, wherein said solid portions defining said openings are arranged in patterns that are asymmetric with respect to any line and point lying within the area of the respective leaf, so as to avoid harmonic vibrational distortions of the motion of the head.

11. A magnetic head mount as recited in claim 10, wherein said solid portions defining said openings are arranged to have substantially equal cross-sectional areas transverse to the respective leaf lengths at any given point along said respective lengths, further to avoid harmonic vibrational distortions of the head motion.

12. A magnetic head mount as recited in claim 9, wherein said solid portions defining said openings are arranged in patterns that are asymmetric with respect to the central plane that is orthogonal to the width dimensions of the leaves; and said solid portions defining said openings are also arranged to provide cross-sectional areas for the leaves, in planes normal to the lengths of the leaves, that are equal in value at any point along said lengths.

13. A magnetic head mount as recited in claim 12, wherein said patterns are also asymmetric with respect to the transverse centerlines of the leaves.

14. A magnetic head mount as recited in claim 9, wherein said spring leaves are formed to present wavy profiles in planes orthogonal to the width dimensions of the leaves;

said wavy profiles being different for the two leaves, so as to avoid harmonic vibrational distortions of the head motion.

15. A magnetic head mount as recited in claim 14, wherein said spring leaves are formed to present sine-wave profiles in planes orthogonal to the width dimensions of the arms;

said sine-wave profiles having equal wave-height amplitudes but different wave-length periods for the two leaves, so as to avoid harmonic vibrational distortions of the head motion.

16. A magnetic head mount as recited in claim 9, in which a first of said leaves is longer than the second and extends to a greater length dimension from said base member; and said first leaf forms one side of said rigid head carrying member;

whereby the two leaves are caused to have different shapes for the purpose of decreasing their tendencies to resonate beatingly together.

17. A pantographic mount for reciprocating a magnetic transducing head relative to a magnetic tape and including a support base and electromagnetic means for reciprocating the magnetic head, comprising:

a rigid tip structure formed with a rigid wedge-shaped box construction characterized by selected length, width and height dimensions which provide the rigid tip structure while supporting the head in a normal relationship to the tape;

a pair of elongated spring leaves rigidly secured at first ends to the support base and rigidly secured at their other ends to the rigid tip structure to define a unitary configuration which unitary configuration mitigates torsional distortions along a length axis thereof, said leaves being parallel to each other to define a pantograph configuration;

said leaves having different structural configurations for generating different natural frequencies of vibration while still causing the rigid tip structure to deflect the head in said normal relationship to the tape; and said unitary configuration of said rigid tip structure secured to said other ends of the spring leaves of different natural frequencies of vibration, providing rigidity against torsional deformation of the photographic mount as said rigid tip structure and the head are reciprocated normal to the tape during transducing by the electromagnetic means.

* * * * *

UNITED STATES PATENT AND TRADEMARK OFFICE
CERTIFICATE OF CORRECTION

PATENT NO. : 5,047,883

DATED : September 10, 1991

INVENTOR(S) : William N. Aldrich, Sidney D. Miller, Steven L. Magnusson

It is certified that error appears in the above-identified patent and that said Letters Patent is hereby corrected as shown below:

Inventors: William N. Aldrich, Redwood City
Sidney D. Miller, Mountain View
Steven L. Magnusson, Redwood City
all of California Signed and Sealed this Sixth Day of April, 1993

Attest:

STEPHEN G. KUNIN

*Attesting Officer*     Acting Commissioner of Patents and Trademarks